UNITED STATES PATENT OFFICE.

JOHN H. STEVENS, OF NEWARK, AND FRANK C. AXTELL, OF EAST ORANGE, NEW JERSEY, ASSIGNORS TO THE CELLULOID COMPANY, OF NEW YORK, N. Y., A CORPORATION OF NEW JERSEY.

PYROXYLIN COMPOUND.

SPECIFICATION forming part of Letters Patent No. 568,104, dated September 22, 1896.

Application filed July 23, 1896. Serial No. 600,239. (No specimens.)

*To all whom it may concern:*

Be it known that we, JOHN H. STEVENS, of the city of Newark, and FRANK C. AXTELL, of the city of East Orange, county of Essex, State of New Jersey, citizens of the United States, have invented certain new and useful Improvements in Pyroxylin Compounds, of which the following is a specification.

The pyroxylin compounds to which the present invention relates consist of soluble pyroxylin dissolved in or combined with either solid or liquid solvents. Suitable coloring matters or pigments are also employed in the mixtures in making imitations of various substances. The compositions are also employed in the liquid state, as varnishes or solutions for coating or waterproofing surfaces, and are also flowed upon smooth surfaces, for instance, glass, to form films or sheets to be stripped therefrom after the evaporation of the liquid solvent.

The nature of the pyroxylin employed and the various solvents and other substances used in connection with it are well known to the art to which this invention appertains, and are also set forth in various patents and publications, especially the United States Patents No. 517,987, of April 10, 1894; No. 542,692, of July 16, 1895; No. 559,823, of May 12, 1896, and No. 543,108, of July 23, 1895, all issued to John H. Stevens, one of the present applicants, and No. 510,617, of December 12, 1893, issued to John H. Stevens and Frank C. Axtell, both the present applicants. These patents describe the manipulations to which the pyroxylin compounds are subjected and many of the applications of the finished products.

Our present invention is based on the fact that the organic carbanilates, a series of substances well known to chemistry, can be usefully applied to the manufacture of pyroxylin compounds, because of their solvent power on pyroxylin and other valuable characteristics when associated with it. We find that they can be successfully employed to replace the older solid solvents, like camphor, or, if necessary, can be used in connection with the various older combinations. The organic carbanilates are formed by the action of the chloroformic esters of the fatty alcohols on anilin (phenylamin). For instance, ethyl carbanilate is formed by acting on anilin with ethylic chloroformate, thus:

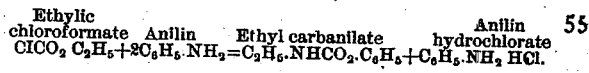

While there may possibly be a carbanilate corresponding to each alcohol, we have investigated only those carbanilates which contain the radicals belonging to the monohydric monatomic series of fatty alcohols. Our experience is confined to the following:

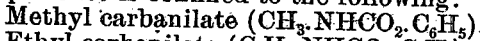
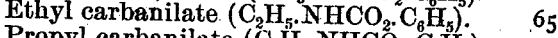
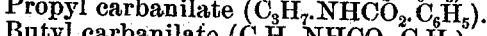
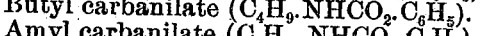
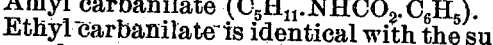

Ethyl carbanilate is identical with the substance known as "phenyl urethane" or "ethyl phenyl carbamate" ($C_2H_5.NHCOO.C_6H_5$).

The series of bodies known as "organic urethanes" is the subject of a separate application filed simultaneously herewith by John H. Stevens, one of the applicants herein, Serial No. 600,420; but the phenyl urethane or ethyl carbanilate belongs more properly to the present group of solvent carbanilates because of chemical relationship, action as a solvent, and other reasons, and is therefore included in the present application.

The propyl, butyl, and amyl carbanilates are capable of existing in various modifications, dependent on supposed molecular structure; but we have made and used those which are more readily produced, and therefore recommend and prefer normal propyl carbanilate, iso-butyl carbanilate, and iso-amyl carbanilate. Our invention, however, includes the use of all the organic carbanilates in pyroxylin combinations, provided the melting-points are sufficiently low to dissolve the pyroxylin without decomposition. So far as we have ascertained the melting-points of all the organic carbanilates are inclined to be low. We have not been able to find "iso-amyl carbanilate" described in any of the standard works on chemistry; but it is easily produced by a reaction analogous to that given—that is, by acting on iso-amylic chloroformate with anilin. It crystallizes from ordinary liquid paraffin (benzine) in fine needles, which melt at 52° centigrade.

The following description of the members of the preferred group of carbanilates applies especially to the chemically pure substances. In practical work it is not always necessary that the carbanilate employed should be absolutely pure. It might, for instance, contain other carbanilates or substances which are more or less useful, or, at least, not injurious in pyroxylin compositions. We do not confine ourselves therefore to the use of any particular carbanilate having the identical properties given by the authorities as belonging to the pure substance represented by the chemical formula above specified. It is sufficient for our purpose if the solvent possesses enough of the carbanilate principle to be useful, though of course we recommend that the substance to be employed be in as pure a state as possible consistent with economy. Subject to such reservations we give the preferred group of carbanilates.

Methyl carbanilate is a colorless crystalline substance of slight odor. Its melting-point is 47.2° centigrade. It is easily soluble in the ordinary liquid menstrua employed in this art. Though somewhat weaker than camphor in its direct solvent action when melted, nevertheless it forms strong plastic compounds with pyroxylin and can be employed in the same manner as camphor. In compounds for rolling grain alcohol is an excellent liquid menstruum when used with methyl carbanilate.

Ethyl carbanilate is a colorless crystalline substance with a faint sweetish odor. Its melting-point is 45.5° centigrade. It is easily soluble in such ordinary menstrua as alcohol, wood-spirit, and amyl acetate, and can be used like the methyl carbanilate.

Normal propyl carbanilate is a colorless crystalline substance possessing a faint but not unpleasant odor. Its melting-point is 55.2° centigrade. It resembles methyl carbanilate in solubility and solvent powers, and although slow in solvent action on pyroxylin when melted, nevertheless in the usual combinations it gives a good homogeneous compound possessing excellent plasticity.

Iso-butyl carbanilate occurs in colorless needles of moderately strong but not unpleasant odor. Its melting-point is 82.2° centigrade. In solubility it resembles methyl carbanilate, although not so freely soluble as the latter. In making rolling compounds with iso-butyl carbanilate it is best to use wood-spirit, although the other liquid solvents are useful in proportion to their active solvent powers. Iso-butyl carbanilate, when thoroughly combined with the pyroxylin, gives good plastic results.

Iso-amyl carbanilate occurs in small colorless needle-shaped crystals having a faint sweetish odor. Its melting-point is 52° centigrade. It is a useful solvent of pyroxylin, but is less active than the other members of the preferred group. It nevertheless forms useful compositions. We prefer to use wood-spirit as the liquid menstruum in making rolling compounds with it. With all of the carbanilates we employ the usual liquid solvents when making compositions of a fluid or flowable nature. To overcome the difficulties connected with the weak solvent action of the higher carbanilates, like the amyl carbanilate, it is only necessary to mix them with the lower carbanilates, like the methyl carbanilate, for instance. The result is a compound carbanilate solvent which gives superior plastic effects. In fact, the mixture of the carbanilates gives improved results over a single carbanilate because of this property. Compounds of extreme plasticity can be produced by combining the carbanilates with camphor when making a solvent for the pyroxylin. When a carbanilate or mixture of carbanilates is used in equal proportions with camphor, the resulting pyroxylin compounds are remarkably soft and plastic. By varying the proportions of camphor the operator is enabled to produce a very wide range of plasticities. In making camphor-carbanilate roll mixtures the best results are obtained by grinding the damp nitrocellulose with either the camphor or carbanilate and adding the remaining constituent of the solid solvent with the liquid menstrua after the nitrocellulose is dry. The carbanilates are also useful with acetanilid. The series of substances known as "urethanes," which form the subject of a separate application, previously mentioned, Serial No. 600,420, can also be employed with the carbanilates, the result being an improvement over the use of either the carbanilates or of the urethanes separately. Excellent plastic effects are obtained by these mixtures.

As to the application of these solvents in making the various compositions, it is sufficient to state that in massive or rolled compounds we employ from forty to fifty parts of solid solvent to each one hundred parts of pyroxylin, whether the solid solvent consists of a single solvent or of a mixture of the substances given.

The solubility of the carbanilates in the different liquid menstrua usually employed in this art must be taken as a guide in the selection of the proper liquid solvent. As a rule the lower carbanilates, that is, the methyl carbanilate and the ethyl carbanilate, permit the employment of weak solvents, like alcohol, while the higher carbanilates work the best with strong solvents, like wood-spirit. The various mixtures of the carbanilates permit the employment of alcohol, especially in compositions for rolling.

For liquid compounds we prefer a solvent selected to produce the particular effect obtainable by the use of such solvents, as is well understood. In liquid compositions we usually employ about twenty-five parts of the solid solvent to each one hundred parts of the pyroxylin, though in making compositions which, when dried are to be soft or extremely plastic, we have used as high as one part of the solid solvent recommended for such particular purposes to each part of pyroxylin. In making solid compositions without the employment of liquid solvents it is usual to employ larger proportions of the solid solvent than when liquid solvents are also employed. The operator must simply avoid using so large a proportion that the quality of the material will be impaired, as is well understood.

When the dried compositions containing the carbanilate or carbanilates are heated to such an extent that they become plastic or soft, such softening action is due to the solvent power of the carbanilate solvent. Hence we claim that any heating of these compounds in such a manner as to soften them or render them plastic constitutes an employment of the carbanilate as a solvent.

What we claim, and desire to secure by Letters Patent, is—

1. The process of manufacturing pyroxylin compounds which consists in intimately mixing one or more of the organic carbanilates with pyroxylin and subjecting the mixture to heat and pressure, substantially as described.

2. The method for the production of compounds of pyroxylin, which consists in intimately mixing one or more of organic carbanilates, pyroxylin, and one or more solvents of pyroxylin, and then subjecting such mixture to heat and pressure, substantially as set forth.

3. The method for the production of compounds of pyroxylin, which consists in intimately mixing one or more of the organic carbanilates, pyroxylin, and camphor, and then subjecting such mixture to heat and pressure, substantially as set forth.

4. The method for the production of compounds of pyroxylin which consists in intimately mixing one or more of the organic carbanilates with pyroxylin and one or more solvents of pyroxylin, sufficient in amount to convert the mixture into a pyroxylin compound or solution, substantially as set forth.

5. The process of manufacturing pyroxylin compounds which consists in grinding the damp nitrocellulose with either the camphor or one or more of the carbanilates, and adding the remaining constituent of the solid solvent with the liquid menstrua after the nitrocellulose is dry, substantially as described.

6. As a new composition of matter, a pyroxylin compound containing one or more of the organic carbanilates and pyroxylin, substantially as described.

7. As a new composition of matter, a compound of pyroxylin containing one or more of the organic carbanilates, camphor and pyroxylin, substantially as described.

8. As a new composition of matter, a compound of pyroxylin containing one or more of the organic carbanilates and one or more solvents of pyroxylin, substantially as described.

In witness whereof we have hereunto signed our names this 29th day of June, 1896.

JOHN H. STEVENS.
FRANK C. AXTELL.

In presence of—
ABRAHAM MANNERS,
HORACE S. MILLER.

Correction in Letters Patent No. 568,104.

It is hereby certified that in Letters Patent No. 568,104, granted September 22, 1896, upon the application of John H. Stevens, of Newark, and Frank C. Axtell, of East Orange, New Jersey, for an improvement in "Pyroxylin Compounds," an error appears in the printed specification requiring correction, as follows: In line 17, page 2, the word "formula" should read *formulæ;* and that the said Letters Patent should be read with this correction therein that the same may conform to the record of the case in the Patent Office.

Signed, countersigned, and sealed this 29th day of September, A. D. 1896.

[SEAL.]
                                      WM. H. SIMS,
*First Assistant Secretary of the Interior.*

Countersigned:
    S. T. FISHER,
        *Acting Commissioner of Patents.*